Feb. 20, 1940.  W. H. BASELT  2,191,138
CLASP BRAKE
Filed Dec. 16, 1937  4 Sheets-Sheet 1
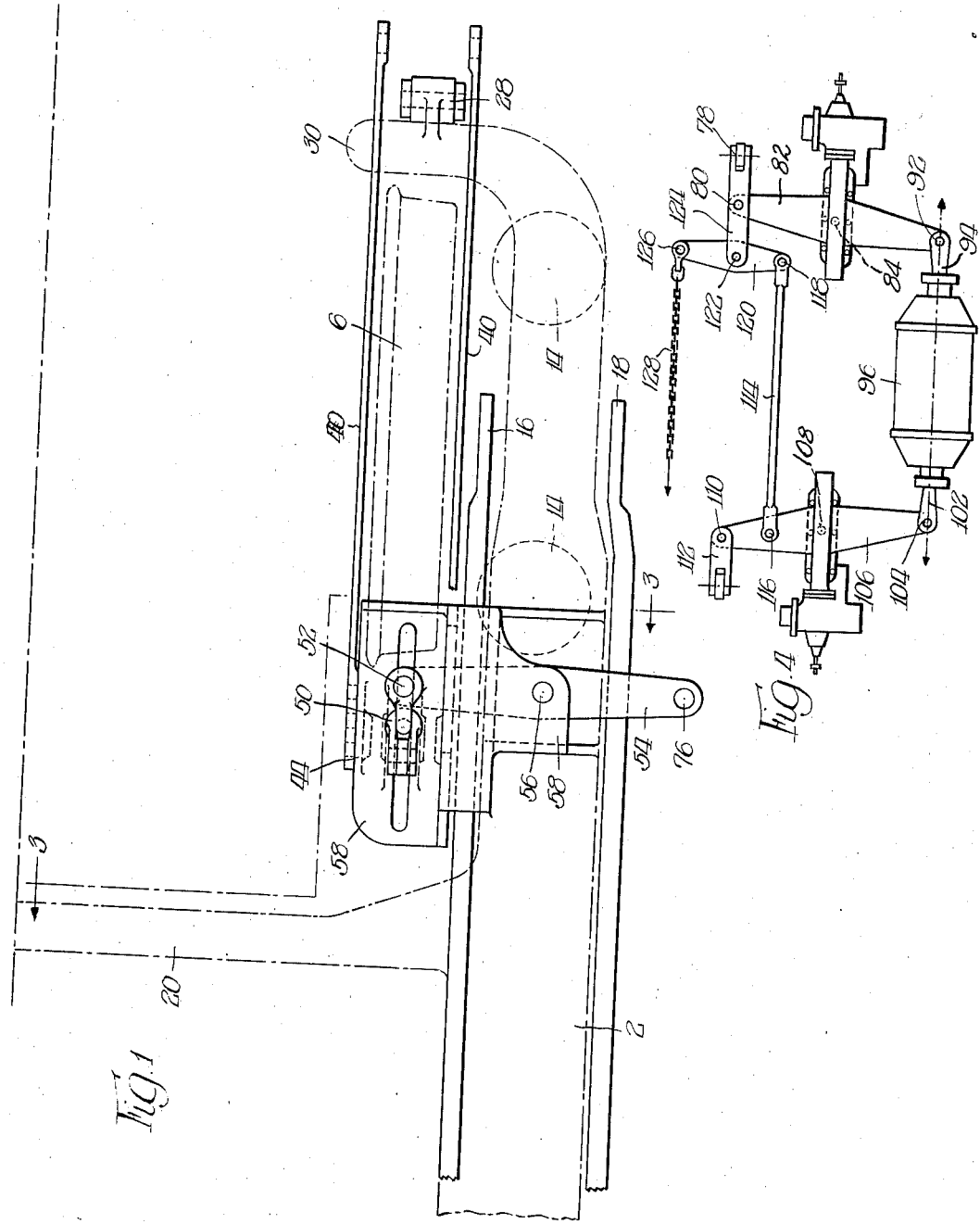
Inventor:
Walter H. Baselt,
By Orrin O. B. Garner
attÿ.

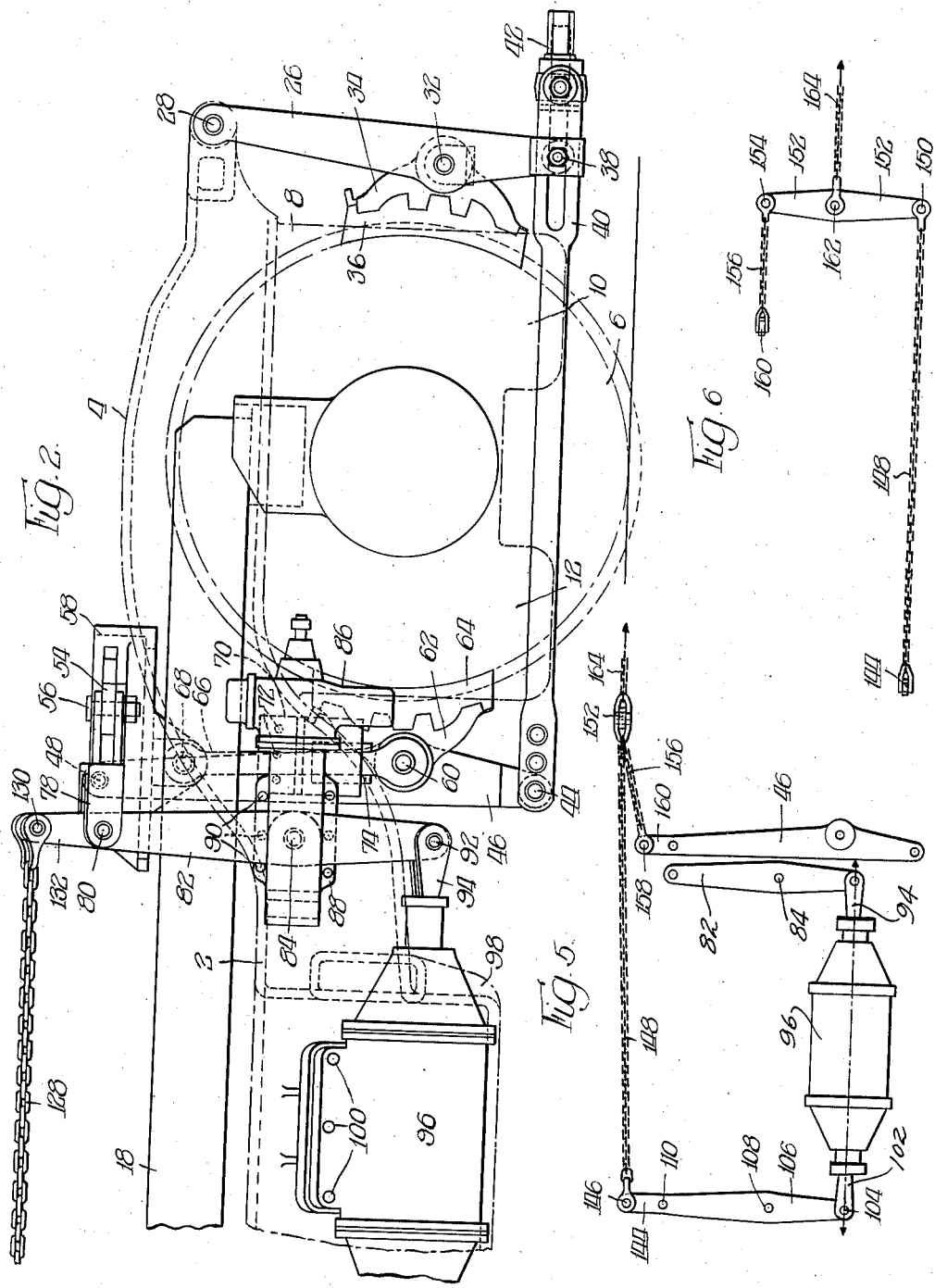

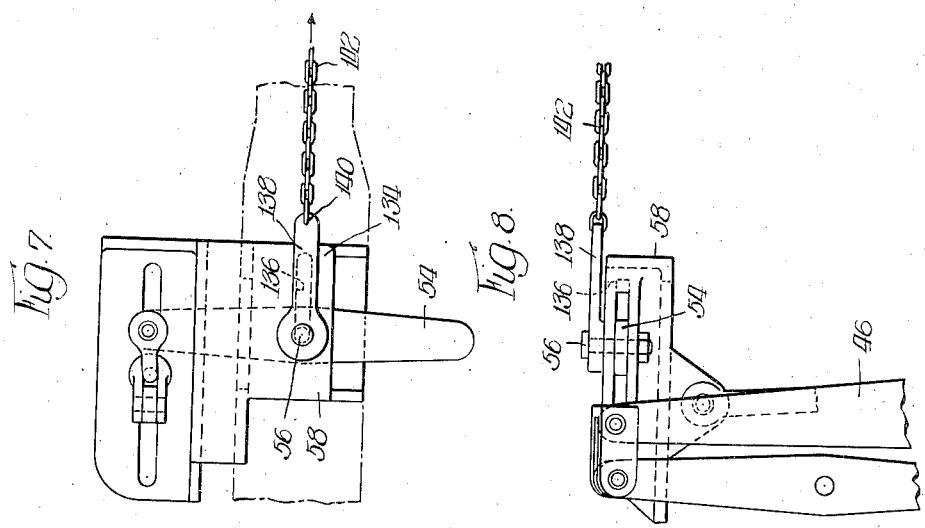
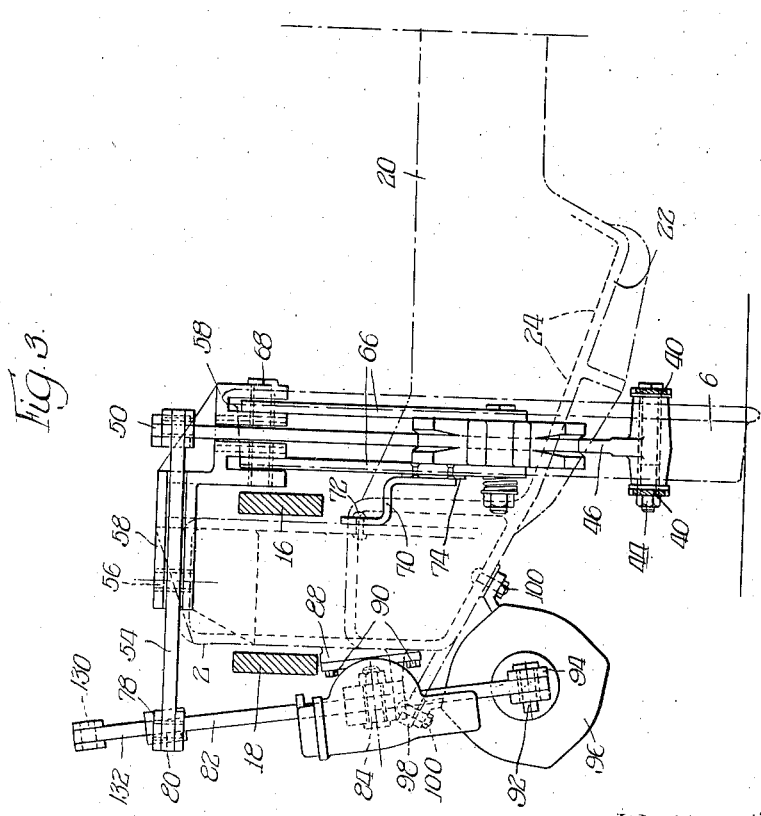

Feb. 20, 1940.  W. H. BASELT  2,191,138
CLASP BRAKE
Filed Dec. 16, 1937  4 Sheets-Sheet 4
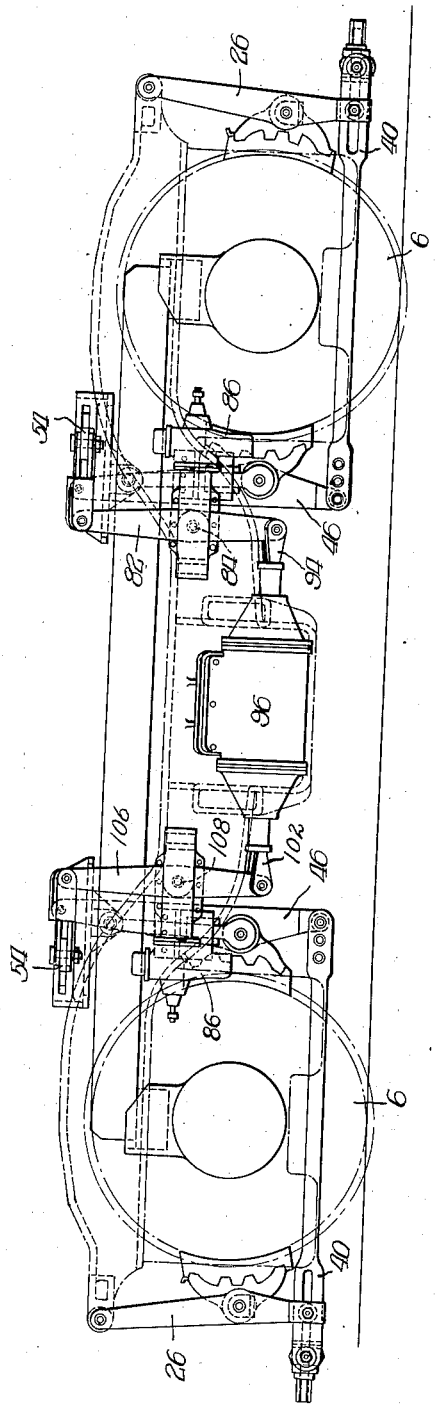
Inventor:
Walter H. Baselt,
By Orin O. B. Garner
Atty.

Patented Feb. 20, 1940

2,191,138

UNITED STATES PATENT OFFICE 2,191,138

CLASP BRAKE

Walter H. Baselt, Chicago, Ill., assignor to American Steel Foundries, Chicago, Ill., a corporation of New Jersey Application December 16, 1937, Serial No. 180,053

26 Claims. (Cl. 188—56)

My invention relates to brake rigging for railway cars of the passenger type and more particularly to a type of such rigging generally designated clasp brake rigging in which brake heads and brake shoes are supported for engagement at opposite sides of each wheel.

An object of my invention is to devise an efficient form of unit cylinder clasp brake rigging for a high speed passenger truck wherein the power means is mounted on the truck framework.

A further object is to devise such a brake structure wherein a single power means on each side member of the truck frame will actuate the brake rigging associated with the wheels on that side of the truck.

Still another object of my invention is to provide hand brake arrangements for such a brake rigging as that mentioned which will operate efficiently in case of failure of the power means.

Expressed generally, the object of my invention is to devise an efficient form of unit cylinder clasp brake structure for a novel type of high speed passenger truck of the motor type wherein the truck is designed to carry motive power in the form of motors as well as other normal structural parts of the truck and the brake rigging.

A more specific object of my invention is to devise such a brake rigging as that generally referred to above wherein double acting power means will be centrally located on each side member of the truck as a means of operating the clasp brake rigging associated with the wheels at the respective sides of the truck.

With these and other objects in mind which will be apparent as the description proceeds, my invention may consist of certain novel features and manners of operation as are more particularly described and claimed in the following specification and the claims associated herewith.

The drawings illustrate an embodiment of my invention wherein Figure 1 is a top plan view showing one-fourth of a truck structure in which my novel brake arrangement has been incorporated. Only one-fourth of the truck structure is illustrated inasmuch as the opposite ends and the opposite sides of the truck and brake arrangement are similar;

Figure 2 is a side elevation of the truck and brake structure shown in Figure 1;

Figure 3 is a sectional view of the truck and brake arrangement shown in Figures 1 and 2, the section being taken substantially in the planes indicated by the broken line 3—3 of Figure 1;

Figure 4 is an elevational view of reduced size, showing the manner in which the double acting power means is connected between the respective cylinder levers and showing also one method of connecting a hand brake arrangement to operate the rigging at both ends of the truck.

Figures 5 and 6 show an alternate form of hand brake connection designed to operate the rigging at both ends of the truck.

Figures 7 and 8 show a further alternate form of hand brake arrangement designed to operate the rigging at only one end of the truck.

Figure 9 is a side elevation showing the complete truck and brake structure in reduced size.

Describing the arrangement in more detail, the novel truck structure which forms no part of my invention has the usual framework comprising spaced side members 2, 2 elevated in the vicinity of the wheels at the opposite ends thereof as indicated at 4 to facilitate cooperation with the journal portion of the wheel and axle assembly generally indicated at 6, said cooperation taking place through the novel form of journal box 8 provided on opposite sides thereof with the well portions 10 and 12 within which are supported the spring means diagrammatically indicated at 14, 14 (Figure 1). Supported over the journal ends of the spaced wheel and axle assembly are the inner and outer equalizer bars 16 and 18 which serve as a means of support for the motors (not shown). Joining the spaced side members at opposite sides of the truck are the spaced transoms 20, 20 which serve as carrying means for the bolster (not shown) which is supported therebetween and upon which the weight of the car body is carried. The framework at the juncture of the side member 2 and the transom 20 is of novel arrangement having the diagonally arranged bottom wall as most clearly seen at 22 (Figure 3) defining with the side walls of the transom 20 a well-like cavity within which resilient bolster supporting means may be seated as at 24, 24.

The brake rigging at each end of the truck comprises the dead hanger lever 26 (Figure 2, right) pivotally hung at its upper end as at 28 from the inwardly turned bracket 30 formed on the end of the side member 2 of the framework. Intermediate the ends of the hanger lever 26 as at 32 is pivotally supported the brake head 34 with the associated brake shoe 36 and the lower end thereof has a pivotal connection as at 38 to the paired inner and outer straps 40, 40, said last named connection being made adjustable by means of the manually operable slack adjuster 42. The opposite ends of the paired straps 40, 40 are pivotally and adjustably connected as at 44 to the lower end of the live brake lever 46, the upper end of said live brake lever being pivotally connected as at 48 to the clevis means 50 (Figure 1), the opposite end of said clevis means being pivotally connected as at 52 to the inner end of the dead auxiliary lever 54, said dead auxiliary lever being fulcrumed intermediate its ends as at 56 from the bracket 58 formed as an integral part of the side member 2. Intermediate the ends of the live brake lever 46 as at 60 is pivotally supported the brake head 62 with the associated brake shoe 64 and likewise connected at the pivotal point 60 are the paired supporting hangers 66, 66, said hangers being hung from the bracket 58 by a pivotal connection therewith as at 68. The bracket 70 (Figure 3), secured to the frame as by rivets 72, 72, serves as a guide means for the hanger 66, the wear plate 74 being secured to the outer portion of said hanger for engagement with said bracket.

The outer end of the dead auxiliary lever 54 has a pivotal connection as at 76 to the clevis means 78, the opposite end of said clevis means having a pivotal connection as at 80 to the upper end of the dead cylinder lever 82, said cylinder lever being adjustably fulcrumed intermediate its ends as at 84 from the automatic slack adjuster 86, said slack adjuster being carried on the bracket 88 of the side frame 2 as by means of bolts 90, 90. The lower end of the dead cylinder lever 82 has a pivotal connection as at 92 to the outer end of the push rod 94 at one end of the double acting cylinder 96. The cylinder 96 is carried on the side frame 2, being secured thereto and to the bracket 98 as by means of bolts 100, 100.

In Figure 9 of reduced size is shown the manner in which the double acting power means 96 is connected between the two similar dead cylinder levers 82, 106 to operate similar brake rigging at opposite ends of the truck on one side thereof.

In the hand brake modification shown in Figure 4 the push rods 94 and 102 at the opposite ends of the power means 96 are pivotally connected as at 92 and 104 to the dead cylinder levers 82 and 106, said dead cylinder levers being adjustably fulcrumed intermediate their ends as at 84 and 108 from slack adjusters as in the modification shown in Figure 9. The connection of the cylinder levers 82 and 106 to the braking means at the opposite ends of the truck is similar to the modification shown in Figure 9 with the cylinder lever 106 connected as at 110 to the clevis 112 and the cylinder lever 82 connected as at 80 to the clevis 78, said clevis 78 being extended as at 124 to form a connection as at 122 providing a fulcrum for the live hand brake auxiliary lever 120, the lower end of said auxiliary lever 120 having a pivotal connection as at 118 to the pull rod 114 whose opposite end is pivotally connected as at 116 to a point intermediate the ends of the cylinder lever 106. The upper end of said live auxiliary lever 120 has a connection as at 126 to the flexible cable 128 whose opposite end is connected to the sheave of the hand brake (not shown) of the usual form.

In Figure 2 I have shown an alternate form of connection for the cable leading to the hand brake wherein said cable 128 is connected as at 130 to the extension 132 formed on the upper end of the dead cylinder lever 82 for that purpose. In this form of connecting the cable it will be apparent that the hand brake mechanism would operate the brake rigging at only one end of the truck.

In Figures 7 and 8 I have shown an alternate form of connection for a hand brake arrangement which will operate the rigging at one end of the truck only. In this form of hand brake connection the bracket 58 is enlarged as at 134 to permit the formation of the slot 136, thus allowing a sliding movement of the auxiliary lever 54 when it is desired to operate the hand brake. In this form of hand brake connection the strap 138 is connected to the auxiliary lever 54 at the pivotal point 56 and the opposite end of the strap 138 is connected at 140 to the hand brake cable 142 which leads to the sheave of the hand brake.

In Figures 5 and 6 of reduced form I have shown a further modification of hand brake connection for my novel brake arrangement. In this arrangement the dead cylinder lever 106 is provided with the extension 144 connected as at 146 to the short flexible cable 148, the opposite end of said cable being connected as at 150 to the outer end of the horizontally arranged sliding lever 152. The opposite or inner end of said sliding lever 152 is connected as at 154 to the short flexible cable 156, the opposite end of said cable having a connection as at 158 to the extension 160 formed for that purpose on the upper end of the live truck lever 46. The sliding lever 152 has a connection intermediate its ends as at 162 to the cable 164 which leads to the hand brake sheave in the usual manner.

In operation of this brake mechanism, assuming the parts to be in released position, actuation of the double acting brake cylinder or power means 96 causes the pistons 94, 102 at opposite ends thereof to move outwardly, thus rotating the dead cylinder levers 82, 106 at opposite ends thereof in reverse directions around the adjustable fulcrums 84, 108 intermediate their ends and rotating the dead auxiliary levers 54, 54 to apply the braking means at the opposite ends of the truck. Actuation of the brake mechanism at opposite ends of the truck is the same and the further description will be limited to that at the right end of the truck as shown in Figures 1 and 2. Counter-clockwise rotation of the dead cylinder lever 82 causes the dead auxiliary lever 54 to rotate in a clockwise direction around the fulcrum 56 intermediate its ends, thus rotating the live truck lever 46 in a clockwise direction about the pivot 44 at its lower end until the brake shoe 64 is brought into engagement with the adjacent wheel. Continued actuation causes the live truck lever 46 to rotate in a clockwise direction about the pivot 60 intermediate its ends, thus moving the paired straps 40 to the left and rotating the dead truck lever 26 in a clockwise direction around its point of support 28 until the brake shoe 36 is brought into engagement with the opposite side of the before-mentioned wheel. Release of the power means causes the various parts to move in directions reverse to those just described, thus effecting their release.

In operation of the hand brake mechanism illustrated in Figure 4, actuation of the hand brake sheave will cause the flexible cable 128 to move to the left, thus moving the upper end of the live auxiliary lever 120 to the left and through the connections at 114 and 124 causing the upper ends of the dead cylinder levers 106 and 82 to move inwardly toward each other, thus effecting actuation of the brake mechanism in the manner previously described as taking place when the power means 96 was operated.

In the hand brake arrangement shown in Figure 2, turning of the hand brake sheave causes the flexible cable 128 to move to the left, thus rotating the dead cylinder lever 82 in a counterclockwise direction around the adjustable pivot 84 intermediate its ends and actuating the brake mechanism at one end of the truck in the manner previously described and independently of the mechanism at the opposite end thereof.

In an alternate form of hand brake arrangement illustrated in Figures 7 and 8 rotation of the hand brake sheave causes the flexible cable 142 (Figure 7) to move to the right and through the strap connection 138 applies movement of translation to the auxiliary lever 54, thus rotating the live truck lever 46 in a clockwise direction and applying the brakes independently at one end of the truck as previously described.

The further alternate form of hand brake connection shown in Figures 5 and 6 operates the brake rigging at both ends of the truck as follows: Rotation of the hand brake sheave causes the flexible cable 164 to move to the right, thus applying movement of translation to the right to the live auxiliary lever 152. Said movement of translation of the live auxiliary lever 152 causes movement to the right of the flexible cable 156, thus rotating the live truck lever 46 and applying the brakes at one end of the truck as previously described; the said movement of translation of the live auxiliary lever 152 also causes the flexible cable 148 to move to the right, thus rotating the dead cylinder lever 106 in a clockwise direction around the pivot 108 intermediate its ends and applying the brakes at the opposite end of the truck as already described.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a railway truck a frame having a side member, double acting power means thereon, supporting wheel and axle assemblies, and braking means associated with the wheels adjacent said member, each of said braking means comprising live and dead truck levers supported on opposite sides of the wheel, and operative connections between the opposite ends of said power means and said braking means respectively, each of said connections comprising a dead cylinder lever fulcrumed from said frame intermediate its ends, a horizontal dead lever connected at its inner end to said braking means and at its outer end to a cylinder lever, and hand brake connections comprising flexible means connected to one of said cylinder levers and to one of said live truck levers.

2. In a four wheel railway truck a frame having a side member, power means on said side member, pistons at the opposite ends of said power means, supporting wheel and axle assemblies, braking means associated with the wheels on one side of said truck and operative connections between braking means of respective wheels and the pistons at opposite ends of said power means, said connections comprising substantially vertical cylinder levers connected to said pistons, horizontal dead levers interconnecting said cylinder levers and said braking means respectively, and hand brake means including a lever fulcrumed intermediate its ends from one of said cylinder levers and operatively connected at one end to the other of said cylinder levers, and a flexible cable connected to the opposite end of said fulcrumed lever.

3. In a railway truck a frame having a side member, double acting power means thereon, supporting wheel and axle assemblies, braking means associated with each of the wheels adjacent said member and connections between opposite ends of said power means and said braking means respectively, said connections comprising dead cylinder levers fulcrumed from said member and having their lower ends connected to opposite ends of said power means, dead levers fulcrumed intermediate their ends from said member and having their outer ends connected to said cylinder levers and their inner ends connected to said braking means respectively, one of said dead levers having a slidable connection with said member and a flexible hand brake means connected at said slidable connections.

4. In a railway truck a frame having a side member, double acting power means thereon, supporting wheel and axle assemblies, and braking means associated with the wheels adjacent said member, each of said braking means comprising live and dead truck levers supported on opposite sides of the wheel, and operative connections between the opposite ends of said power means and said braking means respectively, each of said connections comprising a dead cylinder lever fulcrumed from said frame intermediate its ends and a horizontal dead lever connected at its inner end to said braking means and at its outer end to said cylinder lever, and hand brake means connected to a live truck lever and to a cylinder lever.

5. In a railway truck a frame having a side member, double acting power means thereon, supporting wheel and axle assemblies, and braking means associated with the wheels adjacent said member, each of said braking means comprising live and dead truck levers supported on opposite sides of the wheel, and operative connections between the opposite ends of said power means and said braking means respectively, each of said connections comprising a dead cylinder lever fulcrumed from said frame intermediate its ends and a horizontal dead lever connected at its inner end to said braking means and at its outer end to a cylinder lever.

6. In a four wheel railway truck a frame having a side member, power means on said side member, supporting wheel and axle assemblies, braking means associated with the wheels on one side of said truck and operative connections between the braking means of respective wheels and the pistons at opposite ends of said power means, said connections comprising substantially vertical cylinder levers connected to said pistons and horizontal dead levers interconnecting said cylinder levers and said braking means respectively, and hand brake means comprising a slidable lever and flexible cables connecting the opposite ends of said slidable lever respectively to one of said cylinder levers and to a vertical brake lever.

7. In a four wheel railway truck a frame having a side member, power means on said side member, pistons at the opposite ends of said power means, supporting wheel and axle assemblies, braking means associated with the wheels on one side of said truck and operative connections between the braking means of respective wheels and pistons at the opposite ends of said power means, said connections comprising substantially vertical cylinder levers connected to said pistons, horizontal dead levers interconnecting said cylinder levers and said braking means respectively, and hand operating means including a lever fulcrumed intermediate its ends from one of said cylinder levers and operatively connected at one end to the other of said cylinder levers.

8. In a four wheel railway truck a frame having a side member, power means on said side member, pistons at the opposite ends of said power means, supporting wheel and axle assemblies, braking means associated with the wheels on one side of said truck and operative connections between the braking means of respective wheels and pistons at the opposite ends of said power means, said connections comprising substantially vertical cylinder levers connected to said pistons, horizontal dead levers interconnecting said cylinder levers and said braking means respectively, and hand operating means connected to one of said cylinder levers for manual operation of the braking means associated with the adjacent wheel.

9. In a railway truck a framework having a side member, double acting power means on said member, supporting wheel and axle assemblies, braking means associated with the wheels adjacent said member, and connections between the opposite ends of said power means and said braking means respectively and including vertical cylinder levers fulcrumed intermediate their ends on said member and connected at their lower ends to said power means, and horizontal levers fulcrumed on said member and connecting said cylinder levers and said braking means respectively.

10. In a railway truck a frame having a side member, double acting power means thereon, supporting wheel and axle assemblies, braking means associated with each of the wheels adjacent said member, and connections between opposite ends of said power means and said braking means respectively, said connections comprising vertical dead cylinder levers fulcrumed from said member and having their lower ends connected to opposite ends of said power means, dead levers fulcrumed intermediate their ends from said member and having their outer ends connected to said cylinder levers and their inner ends connected to said braking means respectively.

11. In a railway truck a frame having side members, dual power means mounted on each of said side members, supporting wheel and axle assemblies, braking means associated with the wheels at opposite sides of the truck, and connections between each of said cylinders and the adjacent braking means, said connections comprising cylinder levers fulcrumed intermediate their ends from said frame, and horizontal dead levers fulcrumed intermediate their ends from said frame and connected at their outer ends to said cylinder levers respectively and at their inner ends to said braking means.

12. In a railway truck a frame having a side member, power means mounted thereon, a supporting wheel and axle assembly, braking means associated with the wheel adjacent said member, a vertical cylinder lever fulcrumed intermediate its ends on said member and having its lower end connected to said power means, a dead lever fulcrumed intermediate its ends on said member and having its opposite ends connected respectively to said cylinder lever and said braking means, and flexible hand brake means connected to said cylinder lever.

13. In a four wheel railway truck a frame having side members, double acting power means mounted on said members, supporting wheel and axle assemblies, braking means associated with the wheels at opposite sides of the truck, and connections between said braking means and said power means respectively, each of said connections comprising cylinder levers at opposite ends of said power means, and horizontal levers connecting said cylinder levers with the braking means of adjacent wheels respectively.

14. In a four wheel railway truck a frame having a side member, double acting power means mounted thereon, supporting wheel and axle assemblies, braking means associated with each wheel adjacent said side member, and connections between said power means and said braking means respectively comprising vertically arranged cylinder levers and horizontally arranged dead levers, one of said dead levers having a slidable fulcrum connection intermediate its ends, and a flexible hand brake cable connected at said fulcrum point.

15. In a four wheel railway truck a frame having a side member, power means on said side member, pistons at the opposite ends of said power means, supporting wheel and axle assemblies, braking means associated with the wheels on one side of said truck and operative connections between the braking means of respective wheels and pistons at the opposite ends of said power means, said connections comprising substantially vertical cylinder levers connected to said pistons, and horizontal dead levers interconnecting said cylinder levers and said braking means respectively.

16. In a four wheel railway truck a frame having a side member, double acting power means mounted thereon, supporting wheel and axle assemblies, braking means associated with each wheel adjacent said side member, connections between said power means and said braking means respectively comprising vertically arranged cylinder levers and horizontally arranged dead levers, and hand brake means connected to one of said cylinder levers.

17. In a railway truck a frame having a side member, power means mounted thereon, a supporting wheel and axle assembly, braking means associated with the wheel adjacent said member, a vertical cylinder lever adjustably fulcrumed intermediate its ends on said member and having its lower end connected to said power means, a dead lever fulcrumed intermediate its ends on said member and having its opposite ends connected respectively to said cylinder lever and said braking means.

18. In a railway truck a frame having a side member, double acting power means mounted thereon, supporting wheel and axle assemblies, braking means associated with the wheels adjacent said member, and operative connections between the opposite ends of said power means and said braking means respectively, said connections comprising substantially vertically arranged cylinder levers having their lower ends connected to the respective ends of said power means.

19. In a four wheel railway truck a frame having a side member, double acting power means mounted thereon, supporting wheel and axle assemblies, braking means associated with each wheel adjacent said side member, and connections between said power means and said braking means respectively comprising vertically arranged cylinder levers and horizontally arranged dead levers.

20. In a railway truck a frame having a side member, double acting power means thereon, supporting wheel and axle assemblies, and braking means associated with the wheels adjacent said member, each of said braking means comprising live and dead truck levers supported on opposite sides of the wheel, and operative connections between the opposite ends of said power means and said braking means respectively, each of said operative connections comprising a slack adjuster secured to said side member, a vertical cylinder lever fulcrumed therein and having its lower end connected to said cylinder, and a dead auxiliary lever fulcrumed from said side member and having its inner end connected to the adjacent braking means and its outer end connected to said cylinder lever.

21. In a four wheel railway truck, a frame having a side member, double acting power means mounted thereon, automatic slack adjusters mounted thereon adjacent opposite ends of said power means, supporting wheel and axle assemblies, braking means associated with each wheel adjacent said side member, connections between said power means and said braking means respectively comprising vertically arranged cylinder levers fulcrumed intermediate their ends in said slack adjusters respectively and horizontally arranged dead levers, and connections between said dead levers and said cylinder levers respectively.

22. In a railway truck, a frame having a side member, power means mounted thereon, an automatic slack adjuster mounted on said side member adjacent said power means, a supporting wheel and axle assembly, braking means associated with the wheel adjacent said member, a cylinder lever fulcrumed intermediate its ends from said slack adjuster and having an end connected to said power means, and a dead lever fulcrumed intermediate its ends on said member and having its opposite ends connected respectively to said cylinder lever and said braking means.

23. In a railway truck, a frame having a side member, double acting power means mounted thereon, automatic slack adjusters mounted thereon adjacent opposite ends of said power means, supporting wheel and axle assemblies, brake means associated with the wheels adjacent said member, and operative connections between the opposite ends of said power means and said braking means respectively, said connections comprising cylinder levers adjustably fulcrumed in said slack adjusters with their corresponding ends connected to the opposite ends of said power means.

24. In a railway truck, a frame having a side member, double acting power means mounted thereon, automatic slack adjusters mounted thereon adjacent opposite ends of said power means, supporting wheel and axle assemblies, brake means associated with the wheels adjacent said member, and operative connections between the opposite ends of said power means and said braking means respectively, said connections comprising cylinder levers adjustably fulcrumed in said slack adjusters with their corresponding ends connected to the respective ends of said power means and their opposite ends operatively connected to the braking means at opposite ends of the truck.

25. In a four wheel railway truck, a frame having a side member, double acting power means mounted thereon, slack adjusters on said side member at opposite ends of said power means, supporting wheel and axle assemblies, braking means associated with each wheel adjacent said side member, and connections between said power means and said braking means respectively comprising cylinder levers fulcrumed in said slack adjusters, and horizontally arranged dead levers.

26. In a four wheel railway truck, a frame having a side member, double acting power means mounted thereon, slack adjusters on said side member at opposite ends of said power means, supporting wheel and axle assemblies, braking means associated with each wheel adjacent said side member, and connections between said power means and said braking means respectively comprising cylinder levers fulcrumed from said slack adjusters respectively and horizontally arranged dead levers connected at their inner ends to the braking means at opposite ends of the truck and at their outer ends to said cylinder levers.

WALTER H. BASELT.